Oct. 19, 1937.　　A. MOORHOUSE　　2,096,257
HYDRAULIC VALVE TAPPET
Filed June 17, 1935　　2 Sheets-Sheet 1
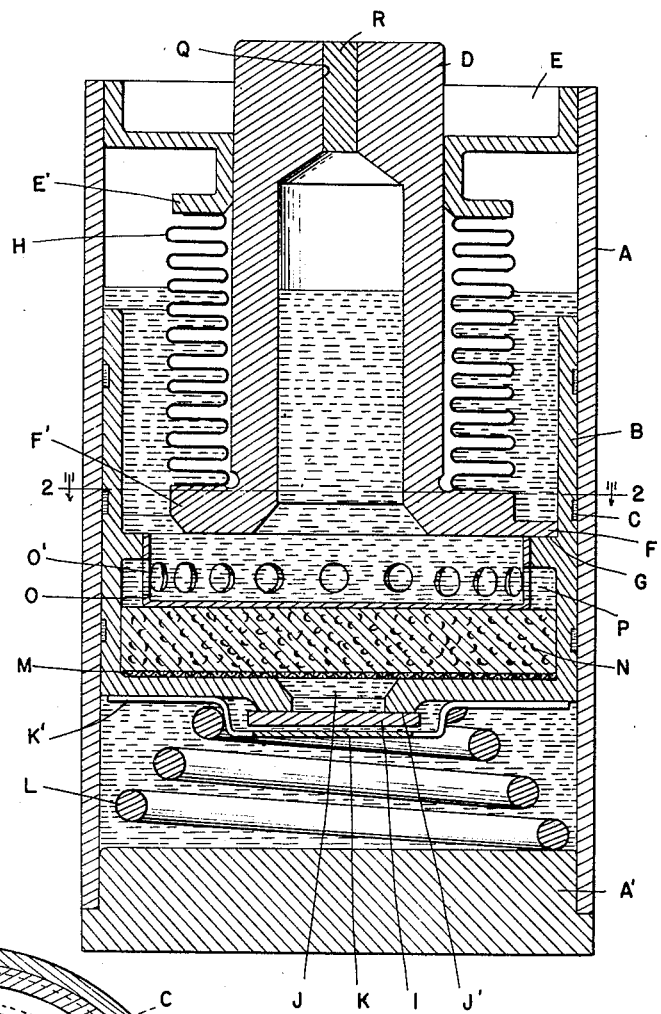
FIG.I.
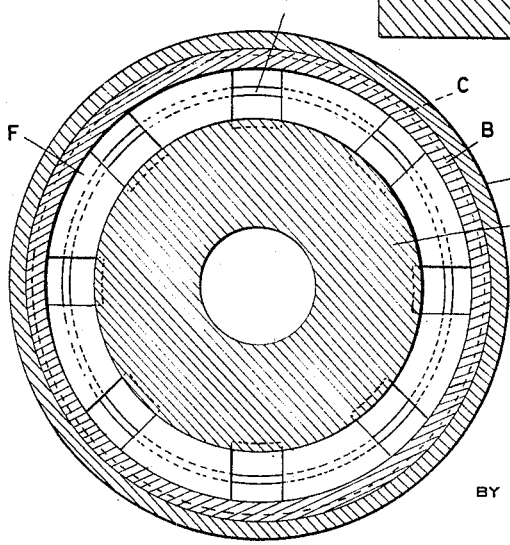
FIG.2.
INVENTOR
ALFRED MOORHOUSE
ATTORNEYS

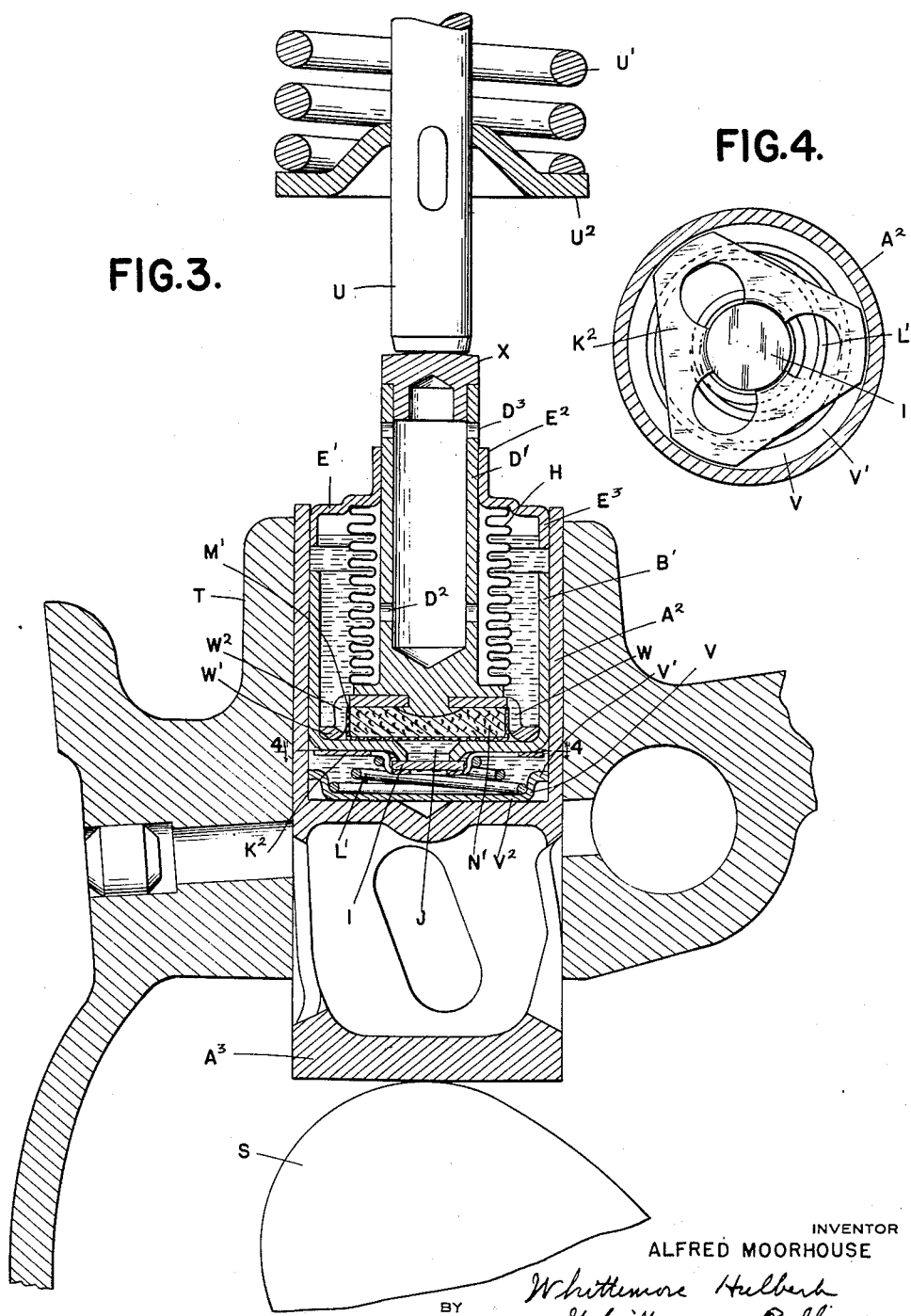

Patented Oct. 19, 1937

2,096,257

UNITED STATES PATENT OFFICE 2,096,257

HYDRAULIC VALVE TAPPET

Alfred Moorhouse, Detroit, Mich.

Application June 17, 1935, Serial No. 27,081

10 Claims. (Cl. 123—90)

The invention relates to valve operating mechanisms and forms a continuation in part of my former application for patent Serial No. 722,574, filed April 26, 1934, and allowed December 27, 1934. The valve mechanism forming the subject matter of the said application is of the type which may be designated as hydraulic and in which clearance is taken up by a substantially incompressible liquid filling a chamber between two relatively movable members. With such constructions there is provision for a slight leakage of fluid from the pressure chamber so as to avoid any danger of holding the valve off from its seat, and there is also means for returning fluid to the pressure chamber during the interval in which the parts are relieved from stress, thereby taking up all lost motion. However, it is essential to the successful operation of the structure that the fluid medium should be substantially incompressible, which necessitates that the liquid should be free from any air or gas bubbles held in suspension therein. Another objection to such mechanisms as heretofore devised is the danger of leakage of the liquid from the system and a further disadvantage is the complexity of the structure.

It is the object of the present invention to obtain a construction of tappet having self-contained hydraulic means for substantially eliminating clearance. It is a further object to effectually prevent the entrance of air or any compressible gas with the liquid into the pressure chamber and still further it is an object to seal the structure against the escape therefrom of any liquid. With these and other objects in view the invention consists in the construction as hereinafter set forth.

In the drawings:

Fig. 1 is a vertical central section through my improved hydraulic tappet;

Fig. 2 is a cross section on line 2—2, Fig. 1;

Fig. 3 is a section similar to Fig. 1 showing a slightly modified construction in connection with the operating cam and valve rod;

Fig. 4 is a cross section on line 4—4, Fig. 3.

As shown in Figs. 1 and 2, my improved tappet comprises two relatively movable members having a telescopic engagement with each other, the one constituting a cylinder and the other a piston dividing the cylinder into two compartments. As illustrated, A is the cylinder member and B is the piston therein which latter is preferably of a cupped form, being provided with a series of circumferentially extending channels C for forming a liquid packing. The piston does not, however, form a liquid tight joint with the cylinder but provides for a slight leakage and the slow escape of liquid from one chamber to the other. D is a plunger slidably engaging an aperture in the head E of the cylinder and provided at its lower end with a spider head F which normally bears against an annular shoulder G within the cupped piston. A liquid tight seal is provided between this plunger and the apertured head E, preferably comprising a flexible bellows H, one end of which is soldered or otherwise attached to a flange E' on the head E, while the opposite end is similarly attached to a shoulder F'' on the spider head F. I is a valve specifically shown as a disk which controls a central port J in the head of the piston B and engages an annular seat J' surrounding said port. K is a retainer for holding the valve in proximity to its seat but with sufficient clearance for the passage of fluid when the valve is unseated. L is a spring shown as a conical helix its lower end being seated on a head A' forming the end of the cylinder A and its upper end engaging a flange K' on the retainer K, holding the same against the piston B.

With the parts as thus far described, assuming that the chamber below the piston is filled and that above the piston partly filled with a liquid such as oil, the spring L if under tension will act to raise the piston B, permitting liquid in the upper chamber to pass downward through the port J, unseating the valve I and entering the lower chamber. This will move the plunger D upward against the valve stem (not shown) taking up all clearance but without exerting sufficient pressure to unseat the valve. When the tappet is actuated by any means (not shown) the liquid in the chamber below the piston will transmit the lifting stress thereto and to the plunger D, thereby opening the engine valve. However, the fact that there is a slight leakage between the piston and cylinder will permit escape of enough fluid from the lower chamber into the upper one so that upon reverse movement there will be a slight clearance permitting the engine valve to fully seat. During the interval of rest this clearance will be taken up by the lifting of the piston B through the tension of the spring L and during such movement the valve I will unseat, allowing fluid from the upper chamber to flow into the lower chamber so as to completely fill the latter.

In the operation just described and with the structure as thus far given, there would be danger of introducing air into the liquid so that the latter would lose its incompressible quality. This is for the reason that the upper chamber can not be completely filled with liquid and therefore will contain a certain amount of air. During the rapid operation of the tappet a churning effect would be produced, mixing air with the liquid which eventually would pass from the upper chamber to the lower chamber and would constitute a compressible medium therein. I have therefore devised a construction which while permitting mixture of air with the liquid in the upper chamber, will absolutely preclude passage of any air downward into the lower chamber, the construction being as follows: M is a screen or perforated member resting on the bottom of the cupped piston and covering the port J. N is a filtering material such as wool felt, supported on the screen M and held in position by a cup shaped cap O thereabove. This cap fits within the annular shoulder G and is provided with a series of ports O' permitting passage of fluid from the upper chamber into an annular chamber P at the margin of the filtering material N. With this construction assuming that the liquid in the upper chamber and which passes through the ports O' contains a certain amount of air in suspension therein, this liquid to pass to the port J must first traverse the filtering material N, passing radially inward therethrough. Thus any air bubbles will be prevented from passing so that the liquid which finally enters the port J is free from bubbles and is practically incompressible.

To provide for originally filling the chamber with liquid, a port Q is arranged in the upper end of the plunger D and after filling, this port is closed by a pressed-in plug R or other suitable means. The liquid introduced does not completely fill the upper chamber but leaves a certain volume of air therein which forms an elastic cushion. This permits change in volume of the liquid due to expansion or contraction under temperature changes without necessitating a corresponding change in length of the telescopic members. This elastic medium also assists in propelling the liquid through the port J when the piston is moved upward by the spring L, as this movement would create a vacuum in the chamber beneath the piston. Furthermore, when the tappet is in operation, the heat of the engine will raise the pressure of the air within the cylinder to increase the force for moving the liquid through the port J.

In the slightly modified construction shown in Figs. 3 and 4, the cylinder $A^2$ is shown as integral with a hardened hollow head $A^3$ which directly engages the cam S. This cylinder is slidable in a bearing T on the engine frame, and the plunger is engaged with the valve rod U provided with the usual seating spring U' engaging the collar $U^2$ on said rod.

One improved feature in this construction over that shown in Fig. 1 is that the plunger D' is hollow and is provided with a series of ports $D^2$ for connecting its interior with a space between the plunger and the flexible bellows H. There are also vent ports $D^3$ located in the plunger above the head E'. The purpose of the construction is to vent the space between the plunger and the flexible bellows so as to avoid accumulation of lubricant in such space, as might be possible with the construction shown in Fig. 1. As the lubricant is substantially incompressible the filling of the space therewith would prevent the functioning of the bellows, but with the construction of Fig. 3 this is impossible. It may, however, be desirable to retard the movement of the plunger which can be accomplished by suitably restricting the ports $D^2$ so as to form in effect a dash pot.

Another improved feature in the construction of Fig. 3 is in the head E'. This is provided with a bearing portion $E^2$ in which the plunger slides and a depending annular flange $E^3$ which has a press fit in the cylinder $A^2$. With this construction when the parts are being assembled the hydraulic fluid is first introduced into the cylinder before the head E' is engaged. The head is then pressed into engagement and by reason of the depending flange $E^3$, a measured quantity of air is trapped therein and is compressed when the head is forced inward into engagement with the cylinder. Thus this compressed air forms an elastic medium for maintaining a predetermined pressure upon the fluid within the upper chamber of the cylinder and the amount of pressure can be predetermined by the length of the depending flange $E^3$. This therefore forms a convenient means for attaining the desired result.

Another feature is the means for limiting the downward movement of the piston B' in the cylinder $A^2$. In the construction shown in Fig. 1 the only limiting means is the spring L which being of conical form can be completely flattened with all the convolutions in one plane. In Fig. 3 I have placed an annular member V, the upper flange V' of which forms a stop for the piston, while the lower flange $V^2$ forms an abutment for the spring L'. By this construction the inward movement of the piston and plunger may be exactly limited.

Another improved feature is the means for holding the filtering material. This comprises an inverted cup W which is secured to the lower end of the plunger D' and is provided at its lower end with the outwardly extending annular flange W' which fits within the cylinder. The peripheral portion of this cup has a series of apertures $W^2$ therein through which the hydraulic fluid can pass inward and the filtering material N' is contained within a cup-shaped screen M' which fits within the cup W. The valve I is a disk similar to that shown in Fig. 1 but preferably formed of some light non-metallic material such as "Bakelite" which has a very small inertial factor. This valve is enclosed in a cupped retainer $K^2$ which provides only a limited freedom of movement such for instance as ten thousandths of an inch. Thus the valve is moved towards and from its seat only by the flow of liquid so that in reseating a certain amount of liquid will pass upward through the port J before the closing of said port. This is not detrimental inasmuch as it provides for a slight clearance for the tappet such for instance as one thousandth of an inch, thereby insuring the full seating of the engine valve.

The operation of this improved construction is the same as that previously described, with the exception that as the resilient pressure on the fluid in the upper chamber is more accurately predetermined, the flow of liquid through the filter and port J is controlled. A further control of the movement of the plunger is through the dashpot formed by the restricted ports $D^2$. The hollow plunger D' reduces inertial force and provides for the connection thereto of a hardened cap member X which directly engages the valve rod U.

My improved tappet, either of the form shown in Fig. 1 or that in Fig. 3, may be used with any construction of valve mechanism adapted for mechanical tappets, and may be used as a replacement for such mechanical tappets.

The pressure exerted by the springs L or L' with respect to the mass actuated thereby and the area of the piston is of importance. In the first place, this pressure should be sufficient to actuate the piston against atmospheric pressure; secondly, the pressure must be sufficient to actuate the mass of the cylinder and to extend the same in the short time interval available for this function. It is, however, equally important that the pressure of the spring should not be too great, as this under certain conditions may be detrimental. For instance, where engines are operating under extremely high speeds, it sometimes happens that the pressure of the valve spring is insufficient to accelerate the mass actuated thereby so as to keep up with the cam. This will separate the cam from the tappet and if the pressure of the spring L is sufficient, the cylinder will be moved outward, thereby unduly elongating the valve rod and preventing seating of the valve. However, this can only occur if the pressure of the spring L is sufficient to accelerate the mass actuated thereby at higher rate than the acceleration produced by the valve spring of the mass actuated thereby. Consequently to avoid such detrimental action, it is only necessary, to limit the pressure of the spring L so that the acceleration produced thereby is less than the acceleration of the valve spring. The factors involved in determining the pressure required in the spring L are, first, the total mass of the cylinder and any part rigidly connected thereto; second, the area of the piston exposed to hydraulic pressure.

What I claim as my invention is:

1. In a valve operating mechanism, two telescopically engaged members, hydraulic resisting means between said members cooperating therewith to permit the slow contraction and rapid extension of the same and including a chamber filled with liquid, a second chamber into which liquid from said first chamber slowly leaks; and a check valve permitting rapid return of liquid from the second chamber to the first during extension of said telescopic members; resilient means for extending said members, and means interposed between said chambers for removing from the liquid passing to said first chamber any gas held in suspension in the liquid of the second chamber.

2. A tappet comprising two telescopically engaged members, one constituting a cylinder and the other provided with a piston for dividing said cylinder into two compartments, one filled with liquid and the other for receiving liquid slowly leaking past said piston, resilient means for extending said telescopic members, a check valve permitting rapid return of liquid from the second chamber to the first chamber during extension of said members, a filter for removing any compressible gas held in suspension in the liquid of said second chamber before passage of the same to said first chamber, a liquid-proof seal between said telescopic members for preventing escape of liquid from said cylinder while permitting relative movement of said members.

3. A tappet comprising two telescopically engaged members, one constituting a cylinder and the other provided with a piston for dividing said cylinder into two compartments, one filled with liquid and the other for receiving liquid slowly leaking past said piston, resilient means for extending said telescopic members, a check valve permitting rapid return of liquid from the second chamber to the first chamber during extension of said members, a filter for removing any compressible gas held in suspension in the liquid of said second chamber before passage of the same to said first chamber, and a liquid-proof seal between said telescopic members comprising a flexible metallic bellows permitting relative movement of said members.

4. A tappet comprising two telescopically engaged members, one constituting a cylinder having an apertured head and the other a plunger engaging the aperture of said head, a flexible bellows between said head and said plunger permitting relative movement thereof and forming a liquid-proof seal, a piston adjacent to said plunger dividing said cylinder into two chambers, one filled with liquid and the other partly filled with liquid and partly with a compressible gas, said piston permitting slow leakage of liquid from said filled chamber to said partially filled chamber, a spring in said filled chamber resiliently pressing against said piston to hold the same in contact with said plunger and to cause an extension movement of the latter, a check valve controlling a port through said piston permitting rapid return of liquid from said partly filled chamber to said completely filled chamber, and a filter through which liquid must pass from said partially filled chamber to said filled chamber whereby any compressible gas held in suspension in the partially filled chamber will be eliminated before entrance into the filled chamber.

5. A tappet comprising a cylinder having an apertured end, a cupped piston in said cylinder dividing the same into a liquid filled chamber and a chamber partly filled with liquid and partly with a compressible gas, said piston permitting slow leakage of liquid from the first to the second chamber, a check valve controlling a port through said piston permitting rapid return of liquid from the second chamber to the first chamber, filtering material in the cup of said piston covering the port for said check valve, an imperforate shield for covering the central portion of said filtering material permitting access of liquid to the peripheral portion thereof, a plunger telescopically engaging said apertured end and bearing against said piston, a resilient bellows forming a liquid-proof seal between said plunger and apertured end, and a spring in said first mentioned chamber for resiliently pressing said piston in a direction to extend said telescopic members.

6. In an hydraulic tappet of the type comprising two telescopically engaged members, one constituting a cylinder and the other a piston with an outwardly extending shank, hydraulic resisting means between said members cooperating therewith to permit a slight contraction and rapid extension of the same; means for forming a liquid-proof seal between said members comprising a flexible bellows within the cylinder surrounding said shank, being connected thereto at one end, and a head for said cylinder apertured for the passage of said shank and connected to the opposite end of said flexible bellows to form a sealed chamber within said cylinder, and means for venting the space in said cylinder between said plunger and flexible bellows.

7. In an hydraulic tappet of the type comprising two telescopically engaged members, one constituting a cylinder and the other a piston with an outwardly extending shank, hydraulic resisting means between said members cooperating therewith to permit a slight contraction and rapid extension of the same; means for forming a liquid-proof seal between said members comprising a flexible bellows within the cylinder surrounding said shank, being connected thereto at one end, and a head for said cylinder apertured for the passage of said shank and connected to the opposite end of said flexible bellows, and a restricted vent port for the space within said cylinder between said plunger and flexible bellows forming a dash-pot for retarding relative movement of said telescopically engaged members.

8. In an hydraulic tappet, two telescopically engaged members, one constituting a cylinder and the other a piston having a hollow shank, and hydraulic resisting means between said members cooperating therewith to permit a slow contraction and a rapid extension of the same; means for forming a liquid-proof seal between said members comprising a flexible bellows within said cylinder surrounding said hollow shank, being connected thereto at one end, a head for said cylinder apertured for the passage of said shank outward therethrough and connected to the opposite end of said flexible bellows, a port for connecting the space between said hollow shank and said bellows with the chamber within said hollow shank, and a vent port between said chamber within said hollow shank and the external atmosphere.

9. In an hydraulic tappet of the type comprising two telescopically engaged members, one constituting a cylinder and the other a piston with an outwardly extending shank, hydraulic resisting means between said members cooperating therewith to permit a slight contraction and a rapid extension of the same; a flexible bellows within said cylinder surrounding said shank, being connected thereto at one end and a head connected to the opposite end of said flexible bellows apertured for the passage of said shank therethrough, said head having a press fit engagement with said cylinder and trapping a predetermined quantity of air which is compressed above said hydraulic fluid and thereby placing the same under resilient pressure.

10. An hydraulic tappet comprising a cylinder, a cupped piston in said cylinder, a check valve controlled port in said piston permitting the rapid movement of fluid therethrough in one direction, a plunger adjacent to said piston within the cup thereof and having an outwardly extending shank, a cylinder head apertured for the passage of said shank therethrough, a flexible bellows surrounding said shank and connected at one end thereto, the opposite end being connected to said cylinder head, an inverted apertured cup at the inner end of said plunger and filtering material within said cup covering said valve controlled port.

ALFRED MOORHOUSE.